(12) United States Patent
Six et al.

(10) Patent No.: US 11,996,239 B2
(45) Date of Patent: May 28, 2024

(54) CAPACITOR

(71) Applicant: TDK Electronics AG, Munich (DE)

(72) Inventors: Birgit Six, St. Josef (AT); Stefan Sax, Graz (AT)

(73) Assignee: TDK Electronics AG, Munich (DE)

( * ) Notice: Subject to any disclaimer, the term of this patent is extended or adjusted under 35 U.S.C. 154(b) by 65 days.

(21) Appl. No.: 17/642,545

(22) PCT Filed: Sep. 17, 2021

(86) PCT No.: PCT/EP2021/075666
§ 371 (c)(1),
(2) Date: Mar. 11, 2022

(87) PCT Pub. No.: WO2022/058528
PCT Pub. Date: Mar. 24, 2022

(65) Prior Publication Data
US 2022/0406526 A1 Dec. 22, 2022

(30) Foreign Application Priority Data
Sep. 21, 2020 (DE) ............ 10 2020 124 520.3

(51) Int. Cl.
*H01G 4/18* (2006.01)
*H01G 4/005* (2006.01)
*H01G 4/14* (2006.01)
*H01G 4/30* (2006.01)

(52) U.S. Cl.
CPC ............ *H01G 4/18* (2013.01); *H01G 4/005* (2013.01); *H01G 4/145* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 3,649,892 A * | 3/1972 | Booe | ............... | H01G 4/18 361/313 |
| 3,783,480 A | 1/1974 | Booe | | |
| 4,728,697 A * | 3/1988 | Bolon | ............... | H01B 3/306 528/80 |
| 4,861,855 A * | 8/1989 | Bockrath | ............... | C08G 73/14 528/125 |
| 5,093,457 A * | 3/1992 | Zecher | ............... | C08G 18/3821 528/68 |
| 2007/0258190 A1 | 11/2007 | Irwin et al. | | |
| 2008/0132673 A1 * | 6/2008 | Sato | ............... | C08L 79/08 528/332 |
| 2010/0259865 A1 * | 10/2010 | Tan | ............... | H01G 4/20 361/313 |
| 2011/0032656 A1 * | 2/2011 | Ito | ............... | H01G 4/145 361/312 |

(Continued)

FOREIGN PATENT DOCUMENTS

DE 3100181 A1 12/1981
DE 102017216109 A1 3/2019
(Continued)

*Primary Examiner* — Dion R. Ferguson
(74) *Attorney, Agent, or Firm* — Slater Matsil, LLP (57) ABSTRACT

In an embodiment a capacitor includes a dielectric layer including a polyamideimide, the dielectric layer being uniform and a first electrode disposed directly adjacent to the dielectric layer.

27 Claims, 3 Drawing Sheets

(56) References Cited

U.S. PATENT DOCUMENTS

| | | | |
|---|---|---|---|
| 2012/0033342 A1* | 2/2012 | Ito | H01G 4/30 |
| | | | 29/25.42 |
| 2012/0091622 A1* | 4/2012 | Suzuki | B29C 48/0011 |
| | | | 264/210.2 |
| 2017/0162325 A1 | 6/2017 | Wang et al. | |
| 2020/0407592 A1* | 12/2020 | Adam | C09D 179/08 |
| 2022/0406526 A1* | 12/2022 | Six | H01G 4/18 |

FOREIGN PATENT DOCUMENTS

| | | | | |
|---|---|---|---|---|
| EP | 1852879 A1 | | 11/2007 | |
| EP | 1852879 A1 | * | 11/2007 | H01G 4/005 |
| EP | 2284850 A1 | | 2/2011 | |
| EP | 2667392 A1 | | 11/2013 | |
| EP | 2667392 A1 | * | 11/2013 | H01G 4/145 |
| JP | 102290008 A | | 11/1990 | |
| JP | 2000338667 A | | 12/2000 | |
| JP | 2003238761 A | | 8/2003 | |
| JP | 2003268189 A | | 9/2003 | |
| JP | 2004111774 A | | 4/2004 | |
| JP | 2004179388 A | * | 6/2004 | H01G 4/206 |
| JP | 2006019621 A | | 1/2006 | |
| JP | 2007115723 A | * | 5/2007 | |
| JP | 2007115723 A | | 5/2007 | |
| JP | 2009038088 A | | 2/2009 | |
| JP | 2011061191 A | | 3/2011 | |
| JP | 2013182908 A | | 9/2013 | |
| WO | 2018168845 A1 | | 9/2018 | |
| WO | WO-2021230089 A1 | * | 11/2021 | |

* cited by examiner

CAPACITOR

This patent application is a national phase filing under section 371 of PCT/EP2021/075666, filed Sep. 17, 2021, which claims the priority of German patent application 102020124520.3, filed Sep. 21, 2020, each of which is incorporated herein by reference in its entirety.

TECHNICAL FIELD

The invention relates to an electrical capacitor.

BACKGROUND

Polymer dielectrics are widely used in power electronic applications, in particular in passive components such as electrical capacitors.

For example, polyimide-containing dielectric films have already been proposed as capacitor dielectrics, such as polyetherimides from U.S. Patent Application Publication 2007/0258190 A1.

Polyamideimides have so far been mainly known for their use as temperature-resistant coatings for enameled wires or the like.

They have been proposed for capacitor applications primarily in connection with inorganic components as dielectric coatings.

Japanese Patent Application JP 2000-338667 discloses that polyamideimide can be a component of a matrix for inorganic particles in a capacitor dielectric.

Patent Application Publication US 2010/0259865 A1 discloses that polyamideimide can be used in a capacitor with a non-homogeneous dielectric layer consisting of an organic polymer material as a first dielectric layer and an inorganic material as a second dielectric layer.

However, no use of polyamideimide as a capacitor material with outstanding temperature stability and simultaneous high or tailored permittivity is known to date.

SUMMARY OF THE INVENTION

According to a first embodiment, a capacitor is disclosed comprising a uniform dielectric layer. In this embodiment, the dielectric layer comprises polyamideimide and at least a first electrode is disposed directly adjacent to the dielectric layer.

The directly adjacent electrode may rest on the layer. Preferably, there is direct contact at the molecular level, such as can be achieved by coating methods described below.

A second electrode is preferably also part of the capacitor. Optionally, or depending on the technical requirements, it is preferred that the second electrode is also arranged directly adjacent to the dielectric layer. In this case, the dielectric layer is sandwiched by the first and second electrodes.

A uniform dielectric layer may, for example, be homogeneous and contain polyamideimide. Here, homogeneous means, in particular, that the dielectric layer is free of additives that would make the layer inhomogeneous. In particular, it is preferred if no micro- or nano-materials or additional other solids are contained in the dielectric layer. Preferably, the dielectric layer does not contain any hybrid material. For example, since electrodes are disposed directly adjacent to the uniform dielectric layer, there are also no other layers different from the uniform dielectric layer between the uniform dielectric layer and the electrodes.

Compared with other polymer-based dielectric layers, a dielectric layer comprising a uniform polyamideimide has the advantage of exhibiting temperature stability up to nearly 300° C. In addition, a polyamideimide-containing dielectric layer can exhibit high permittivity over a wide input frequency range. Preferably, a high breakdown voltage is also maintained.

Thus, polyamideimide as a polymeric material for dielectric layers in capacitor applications can meet opposing requirements for high temperature stability while maintaining tailored or stable dielectric properties.

Thus, a uniform dielectric comprising polyamideimide can replace biaxially oriented polypropylene (BOPP), which is one of the most widely used materials for capacitor dielectrics. This can be advantageous, since BOPP, with a usual service temperature of 105° C. maximum and a low permittivity in the range of 2.2, has reached its performance limits with regard to current developments, especially with regard to temperature stability while maintaining electrical or electronic parameters.

For example, a dielectric layer comprising polyamideimide can exhibit up to 150° C. higher temperature stability. In addition, a permittivity almost twice as high as for BOPP can be achieved even at elevated temperatures.

Thus, requirements even for future applications, for example in aerospace technology, can be met, whereby operating temperatures of over 150° C. possibly of over 200° C. could be achieved.

According to a preferred embodiment of the capacitor, at least 50% by weight of the dielectric layer consists of polyamideimide.

Such a high polyamideimide content in the uniform dielectric layer can ensure that the excellent dielectric properties of the polyamideimide prevail over other possible optional components.

Preferably, the dielectric layer has a polyamideimide content of 90% or more by weight, and even more preferably, the dielectric layer is composed entirely of polyamideimide.

The inventors have recognized that polyamideimide can be well functionalized chemically. It can therefore be flexibly tailored in its properties, e.g., exclusively with organic components, to the excellent electrical or electronic properties that are to be met according to an application. Therefore, the capacitor is preferably fabricated such that the dielectric layer, which is preferably a uniform dielectric layer, is free of solid additional materials, such as inorganic materials. The dielectric layer is preferably not a hybrid material.

A dielectric layer free of inorganic materials may be easier to fabricate than a mixed layer of an inorganic-organic hybrid material.

Preferably, the dielectric layer of the capacitor has polyamideimide main chains comprising the amide and imide groups of the polyamideimide.

This means that, in particular, the main chains of the polyamideimide polymer are formed exclusively via amide and imide bonds, respectively. This does not exclude the possibility that further chemical functions may be attached to or in the main chains.

Polyamideimide compounds or the chemical bonds they contain are stable at high temperatures, which is an advantage for dielectric layers used under high-temperature conditions.

In another preferred embodiment, the polyamideimide main chains contained in the dielectric layer can be chemically crosslinked to each other, i.e. they can have crosslinks.

By means of a tailored number of crosslinks, the mechanical and also electronic properties of the polyamideimide, but also in particular the temperature properties, can be specifically adjusted.

In principle, the term "crosslinking" within the meaning of the application covers any type of covalent chemical bond that exists between polyamideimide main chains or between different points of a polyamideimide main chain. The crosslinks are chemical bonds formed in addition to the chemical bonds between the repeating units of the polyamideimide main chain. Preferably, the number of crosslinks in this case is selected to form a thermoplastic polyamideimide.

Preferably, the crosslinks comprise linear linkages connecting a terminal unit of one polyamideimide main chain to a terminal unit of another polyamideimide main chain, thereby forming a chain link in series. Preferably, the linear linkage between the main chains differs from the linkage type within the polyamideimide main chain. Preferably, then, the crosslink does not have an amide-imide motif. However, the crosslink may be an amide or an imide bond. Such a bond may thereby break the repeating motif of the polyamideimide motif repeating in the polyamideimide main chain. Multiple polyamideimide main chains may be linearly linked in series.

The number of crosslinks can be controlled by the annealing temperature. The higher it is, the more polyamideimide main chains are linked together in series. Thus, the polymer chains become longer with increasing annealing temperature. This can increase the mechanical stability of the dielectric layer. Furthermore, the dissipation factor can be reduced. This way of controlling the degree of crosslinking via temperature is particularly preferred for linear linkages.

Preferably, chemical crosslinks are formed via urethane bridges.

Urethane bridges can preferably be formed via isocyanate groups located on the main chain, which react together with a hydroxy group on another main chain to form a urethane linkage.

Lactams may also be present in the starting material as functional groups, since they serve as protecting groups to control a reaction between an isocyanate group and a hydroxyl group. Such a lactam can be opened, for example, by the action of temperature, forming an isocyanate group which in turn reacts with a hydroxy group, for example another main chain. That is, isocyanate groups or/and lactam functional groups may be present in a starting material. Preferably, however, only lactams are present in the starting material, as this allows a longer storage life to be achieved at room temperature. In addition, the applicable pot life during the manufacture of the dielectric layer can also be extended in this way.

Alternatively or in addition to other crosslinks such as urethane bridges, imide bridges can preferably be formed between polyamideimide main chains.

Imide bridges can, for example, react via the reaction of an anhydride group with a suitable group, such as an amine, on another polyamideimide main chain to form an imide, to form an imide bridge as a crosslink between two polyamideimide main chains. Preferably, the anhydride group is a phthalic anhydride group. Such a reaction can also form a linkage between different points of a polyamideimide main chain.

Both urethane bridges and imide bridges are particularly suitable for the technically simple formation of a linear linkage. In addition, the degree of linear linkage with these groups can be adjusted particularly precisely by controlling the annealing temperature.

Furthermore, crosslinking can also be formed via a urea bridge. This can be formed with the participation of amine groups on the polyamideimide main chain. It is particularly preferred if a three-dimensional crosslink is formed by this, i.e., that not exclusively linear linkages are formed by means of this bonding motif. Even more preferably, only those crosslinks that are not linear linkages can be formed via urea bridges. Particularly preferably, these may be present adjacent to the linear linkages. For example, a polymer material for the dielectric layer that is crosslinked both three-dimensionally via urea bridges and linearly via imide or urethane bridges may be formed.

In principle, urethane bridges can be present in addition to imide bridges. However, it is preferred that only a linear linkage motif is present, as this facilitates process control.

An example of a suitable starting material is, for example, commercially available RESISTHERN® AI 336 L.

An example of such a starting material can be polyamideimide resin solutions, which can also be used, among other things, for the insulation coating of wires or electrodes. An example of such a polyamideimide resin solution is, for example, commercially available RESISTHERN® AI 336 L.

In another preferred embodiment of the uniform dielectric layer of the capacitor, the dielectric layer may be formed such that the polyamideimide main chains are partially aromatic.

Partially aromatic polyamideimide main chains, in particular, contribute to a balance of flexibility and temperature stability. Thus, fully aromatic polyamideimide main chains may be too rigid. However, partial aromaticity, that is, for example, aromaticity at the imide component, can provide the necessary temperature stability while maintaining flexibility.

According to a preferred embodiment, the polyamideimide may have phenylene groups and/or furan groups as functional groups.

The introduction of phenylene groups, for example, in the polyamideimide main chain may be relevant for obtaining the necessary flexibility of the main chain. Thus, depending on the choice made by one or more different phenylene groups in the main chain, the length of the repeating unit and its flexibility are adjusted. For example, biphenyl, di- and triphenylmethane, ortho- and paradibenzylbenzene or tribenzylbenzene can be used as possible phenylene groups. In principle, several different of these or other phenylene groups can also be present in a polyamideimide main chain. That is, it is possible for different phenylene groups to be present in a polyamideimide main chain. However, often only one type of phenylene group is present in a main chain.

Since furans themselves have a high polarity, the polarity of the dielectric layer can be adjusted by choosing different furans. For example, benzofurans, dibenzofurans, furanones or hydroxyfuranones are used for this purpose. For example, the hydroxyfuranones or other furan derivatives may have one or more hydroxy groups, which are required for crosslinking via isocyanate groups, which may be formed from lactam groups, for example, as reaction partners to form a urethane bridge.

According to another preferred embodiment, the polyamideimide may have a structure according to chemical formula 1, wherein here $R^1$ is an unreacted group, such as a lactam, an anhydride or an amine, or a urethane bridge or an imide bridge. Preferably, $R^1$ is a urethane bridge or an imide bridge. Here, $R^2$ may be a phenylene group and $R^3$ may be a furan. Alternatively, $R^3$ may also be a urethane bridge or an imide bridge. In this case, the polyamideimide main chain is linked to two other polyamideimide main chains at both ends.

[chemical formula 1]

In principle, as already described above, lactams are preferred groups that are terminally attached, for example, as $R^1$ in a polymer chain in a starting material. Via the isocyanate groups formed from the lactam, bridges can in principle be formed, for example in the form of urethane bridges, to another polyamideimide main chain. The lactam can be, for example, β, γ, δ or ε lactam. Preferred of these are, in particular, δ and ε lactams.

Urethane bridges can be formed from lactams terminal in the starting material and furans terminal in the starting material with hydroxy groups, thereby connecting main chains in series, and thus elongating them. Through this reaction, the main chains can be crosslinked so that the polyamideimide layer formed has thermoplastic properties. In this process, the number of crosslinks is adjusted so that the dielectric layer of the capacitor does not become too rigid and brittle.

As explained above, linear linking imide bridges can be formed via an anhydride, such as a phthalic anhydride, which reacts with an amine. Alternatively, an isocyanate group can react with the anhydride group to form an imide, splitting off $CO_2$.

In the starting material, i.e., prior to formation of the crosslinks including the linear linkages, the functional groups suitable for the corresponding linkages are located in the $R^3$ or $R^1$ position in chemical formula 1.

In a preferred embodiment of the capacitor, a plurality of first electrode layers are stacked alternately with second electrode layers. A dielectric layer is disposed between every two adjacent electrode layers.

That is, the capacitor may be a multilayer capacitor.

Alternatively, a multilayer capacitor can be cut from a winding, for example. In this case, a conductive or preferably metallic structured layer can be used as an electrode, which has at least two electrically separated regions that thus serve as capacitor electrodes.

According to a further preferred embodiment, all first electrode layers may be electrically conductively connected to a first external contact and all second electrode layers may be electrically conductively connected to a second external contact.

The external contacts may be deposited via flame spraying, PVD processes, or other methods.

A multilayer capacitor with corresponding external contacts allows use in various technical applications.

According to another embodiment, a substrate may be disposed on a side surface of the capacitor that is parallel to the plane of the electrode layers.

As described above, such a substrate can be conductive, thus also fulfilling electrode functions, but it can also have an insulating effect and remain on the component after the fabrication process.

In particular, a capacitor as previously described may be a surface mounted device (SMD).

Further, the capacitor as previously described can also be a through-hole capacitor, that is, it has wires for through-hole mounting. With these wires, the capacitor can be electrically conductive but also mechanically attached to external contact points.

The capacitor can also be a wound capacitor. In this case in particular, the capacitor can have only a single metallization as electrode, which is directly applied to the dielectric layer. A structure with two electrodes directly abutting the dielectric layer is also possible.

In another embodiment, a method of making a capacitor comprising making a dielectric layer is disclosed. The dielectric layer is prepared by depositing a prepolymer polyamideimide solution on a deposition surface, subsequently drying the prepolymer polyamideimide solution on the deposition surface, and annealing the dried prepolymer polyamideimide solution.

The deposition surface may be the surface of an electrode or an electrode layer. The deposition surface may also be a surface of a substrate. The substrate can be the substrate of the finished capacitor, or just an intermediate support from which the deposited and optionally crosslinked polyamideimide film is removed again.

By this process, a previously described capacitor can be produced.

In this way, a uniform dielectric layer can also be produced. The prepolymer polyamideimide solution can in particular be a solution of a resin which is also suitable as an insulating coating, for example RESISTHERN® AI 336 L dissolved in an organic solvent.

Polyamideimides are basically soluble in a wide range of solvents and can be applied in a wide range of concentrations to form closed layers or films. Thus, they are suitable for flexible use of a wide variety of deposition methods or different layers thicknesses, as detailed below.

When drying the prepolymer polyamideimide solution, most or all of the solvent can be removed.

When the dried prepolymer polyamideimide solution is annealed, the material densifies and crosslinking, for example via lactams, can begin in the layer thus formed.

The rate of the crosslinking reaction can be determined by the annealing temperature.

Preferably, the degree of crosslinking is determined by the number of linker groups (e.g. via isocyanate groups protected as lactams) on the polyamideimide main chains in the prepolymer polyamideimide solution, and the annealing temperature is selected such that all linker groups form crosslinks.

In a preferred case, linker groups are terminally located on the polyamideimide main chains. In principle, but especially in this case, the degree of crosslinking can be influenced or adjusted via the annealing temperature. The higher the annealing temperature is selected, the more crosslinks are formed in a given time. As a result, more polyamideimide main chains can be linked together.

As another embodiment, the method as previously described can be modified such that the deposition surface is a surface of a substrate, the dielectric layer is released from the deposition surface after its formation to form a dielectric film, the dielectric film is metallized, and finally the metallized dielectric film is wound.

Thus, the previously described process can be used to produce a wound capacitor. This has the advantage that the dielectric layer or film thus formed, which is provided with the first and second electrodes by metallization, can still be processed before metallization. For example, methods such as film drawing or the like may be used to optimize the material properties.

According to another embodiment, fabricating a capacitor may include the following: An electrically conductive substrate is used, or alternatively, a substrate on the surface of which a first electrode layer is formed. Thus, the deposition surface may be the surface of the electrically conductive substrate or a first electrode layer. After the dielectric layer is deposited on the deposition surface, a second electrode layer may be formed on the dielectric layer, and another dielectric layer may be formed on this second electrode layer by depositing the prepolymer polyamideimide solution on the second electrode layer, drying it, and then annealing it.

In the case of an electrically conductive substrate, this substrate can serve as an electrode, for example as a first electrode. Above this, a second electrode layer can be applied. In this case, of course, another dielectric layer can be deposited on top of the second electrode layer, and then a first electrode layer can be deposited subsequently to obtain a multilayer capacitor.

Alternatively, as described, the substrate may be, for example, non-conductive, that is, electrically insulating. In this case, an electrode layer is applied first before further layers are applied or arranged above the substrate. In both cases, this is a process for building a stacked multilayer capacitor from solution, as opposed to a wound capacitor or a multilayer capacitor cut from a winding.

Preferably for the process described above, the prepolymer polyamideimide solution contains polyamideimide main chains on which isocyanate groups or/and even more preferably isocyanate groups protected as lactam groups are arranged on the polyamideimide main chains.

These have the advantages described above.

Preferably, the process can be carried out such that the prepolymer polyamideimide solution is applied by doctor blade coating, spin coating, slot die coating or spray coating.

BRIEF DESCRIPTION OF THE DRAWINGS

The invention is described in more detail below with reference to exemplary embodiments. These exemplary embodiments are shown in the following figures, which are not to scale. Lengths as well as relative and absolute dimensions can thus not be taken from the figures. Nor is the invention limited to the following embodiments.

DETAILED DESCRIPTION OF ILLUSTRATIVE EMBODIMENTS

Figure 1:
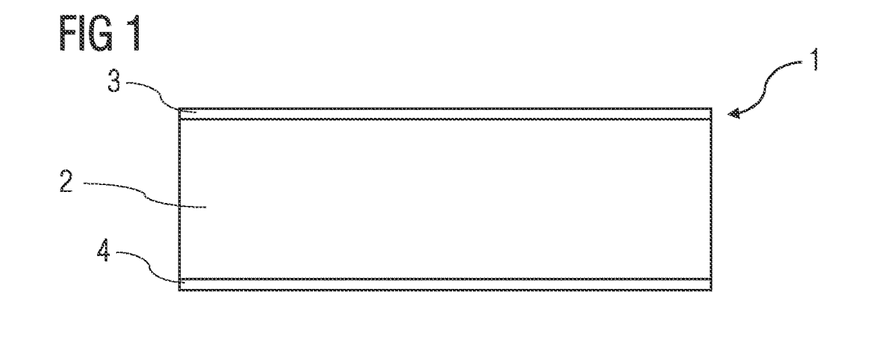
FIG. 1 shows a first embodiment of a capacitor in schematic cross-section.

FIG. 1 shows a first embodiment example of a capacitor 1 in schematic cross-section. The capacitor 1 has an organic dielectric layer 2. The dielectric layer 2 is a uniform layer. This means that it consists of a single material and does not contain any volume regions that can be separated from one another. Thus, it is also not a composite material. At least 50% by weight of the dielectric layer 2 consists of a polyamideimide. Preferably, the polyamideimide content is higher, for example over 90%. Even more preferably, the dielectric layer 2 consists exclusively of polyamideimide.

The polyamideimide can be any polyamideimide, in particular it can be a partially aromatic polyamideimide. Particularly preferred is a polyamideimide according to structural formula 1.

[Structural Formula 1]

The polyamideimide according to structural formula 1 has a polyamideimide main chain and may have multiple functional groups. For example, phenylene groups may be included in the polyamideimide main chain as $R^2$ of structural formula 1. The phenylene groups may adjust the flexibility of the polyamideimide main chain. For example, a biphenyl, a di- or triphenylmethane, ortho- or paradibenzylbenzene or tribenzylbenzene can be used.

Furthermore, furans can be arranged in particular terminally, for example as $R^3$ on the polyamideimide main chain. Their polarity can thus be used to adjust the polarity of the dielectric layer. For example, benzofurans, dibenzofurans, furanones or hydroxyfuranones can be used as furans.

Alternatively, anhydrides can be used as $R^3$.

Furthermore, crosslinks preferably exist between the various polyamideimide main chains in the dielectric layer 2.

Preferably, the polyamideimide main chains are linked to each other via urethane bridges and/or imides. These linkages may, for example, be terminally located at the position of residue $R^1$ in structural formula 1. Alternatively, unbridged groups may still be present in the $R^1$ position, such as lactame isocyanates, or anhydrides.

Preferably, the dielectric layer 2 was prepared from a polyamideimide resin mixture suitable for coating wires, e.g. a RESISTHERN® AI 336 L solution.

A first electrode 3 and a second electrode 4 are arranged above and below the dielectric layer 2. Both the first electrode 3, the dielectric layer 2 and the second electrode 4 can be formed flat.

Preferred stacking occurs over the largest areas of the flat formed layers.

The layer thickness of the electrodes can be, for example, 10 to 50 nm, preferably 20 nm. Depending on the manufacturing process, the layer thickness of the dielectric layer 2 can be set in the range between 500 nm and 10 μm.

The electrodes can be made of aluminum or silver, or preferably of an aluminum-zinc alloy. Alternatively, the electrodes may be multilayer electrodes of chromium/aluminum, chromium/silver or chromium/nickel/aluminum or chromium/nickel/silver. In addition to the elements shown here, a protective layer of hydrocarbon compounds, such as parylenes or fluorine-based hydrocarbons, may be applied to the sides of the capacitor that do not have the electrodes (not shown).

As an alternative not shown in the figures, only one electrode may be applied to the dielectric layer.

The first embodiment example of a capacitor shown in FIG. 1 can be made by any method. Preferably, it is fabricated by solvent-based processes. For example, first the first electrode 3 may be fabricated on a substrate. The substrate may be a rigid substrate, such as glass or a semiconductor wafer. It may be a metal film, such as aluminum or copper, or a flexible polymer film, such as polyimide or a release tape. On a surface of the substrate, the first electrode is deposited by physical vapor deposition (PVD), such as sputtering or thermal evaporation.

Now, on the surface of the electrodes 3 as the deposition surface, the dielectric layer 2 made of a prepolymer polyamideimide solution can be deposited. The prepolymer polyamideimide solution preferably contains a polyamideimide that is largely free of crosslinking.

The prepolymer polyamideimide solution is prepared from a commercially available polyamideimide resin mixture (e.g. RESISTHERN® AI 336) by additional dilution with solvents.

The polyamideimide resin blend contains approximately 36% non-volatiles (predominantly polyamideimide main chains) in a solution of N-methylpyrolidone (NMP) and xylene. It has an initial viscosity of 4750±1750 mPa s. Furthermore, it has a density of about 1.1 g/ml.

The polyamideimide solution thus prepared is adjusted with xylene or N-methylpyrolidone to a concentration of 20% or less of the original polyamideimide concentration. For example, a polyamideimide concentration of 19% by mass or 15% by mass with respect to the original polyamideimide-resin mixture is prepared in xylene.

The concentration used depends on the layer thickness to be achieved or on the type of deposition process used.

[ono] The prepolymer polyamideimide solution prepared in this way can now be applied to the surfaces of the first electrode 3 as the deposition surface. The application can be carried out by doctor blade coating, stencil printing, spin coating or spray coating. The coating method depends on the thickness of the dielectric layer 2 to be achieved. In particular, thicker layers in the range between 500 nm and 5 µm can be applied by spin coating or spray coating, or thicker layers in the range, for example, from 1 µm to 10 µm can be applied by doctor blade coating or stencil printing.

The solution thus applied is dried at a temperature between 60 and 100° C., and preferably at 80° C. Subsequently, the dried film is annealed at temperatures above 200° C., preferably at 250° C.

During drying, most of the solvent is removed. Further amounts of volatiles are removed by annealing. In addition, crosslinking between the main chains can begin during annealing. At a temperature of 250° C., largely complete crosslinking can be achieved in 5-10 min. Preferably, isocyanate groups protected as lactams are activated, which subsequently react with hydroxy groups present, for example on furan residues, or with anhydrides.

After cooling, the second electrode 4 can be reapplied by PVD to the dielectric layer prepared in this way.

At the end of the process, the substrate can be removed to obtain the object of FIG. 1. In principle, however, it can also remain on the capacitor.

Figure 2A:
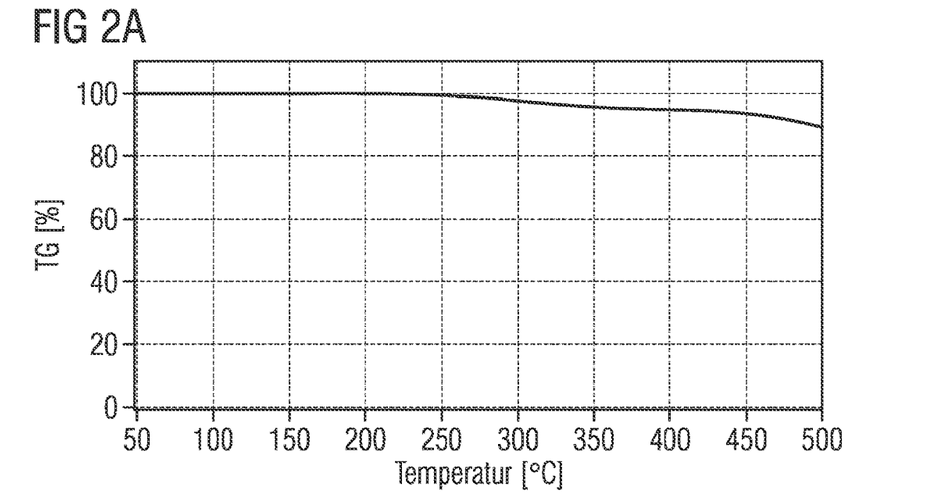
FIG. 2a shows the mass loss of a polyamideimide layer in a thermogravimetric analysis.

FIG. 2A shows a thermogravimetric analysis (TGA) of the polyamideimide-resin blend used. The temperature ramp is a constant 10 K/min. As the graph of FIG. 2A shows, no mass loss occurs up to a temperature of about 275° C. At a temperature above about 300° C. mass loss of less than 5% occurs. Only above 400° C. mass loss above 5% occurs.

This demonstrates the extremely high temperature stability of polyamideimide as a dielectric. In particular, a continuous temperature stability of over 200° C. can be expected for future applications.

In particular, this allows the finished capacitor to be installed, for example by soldering, without degeneration of the component or the dielectric layer being expected.

Further advantageous properties of the polyamideimide as a dielectric for a capacitor are shown in the following Tables 1 and 2 and in the graph of FIG. 2B.

Table 1 shows the dielectric loss factor (tan δ) of a polyamideimide plate capacitor similar to the structure described in FIG. 1. The dielectric layer measured here was made from the polyamideimide-resin mixture described above, which was diluted to a mass fraction of 15%, based on the original mixture with xylene as solvent (doctor blade speed 50 mm/s). The layer thickness was 3 µm, and the area of the capacitor was 50 mm$^2$. The measurement was performed with a Keysight E4990A with cooling/heating system PHECOS from Novocontrol.

TABLE 1

| | tan δ | | | |
| --- | --- | --- | --- | --- |
| | Frequencies | | | |
| Temperature | 1 kHz | 10 kHz | 100 kHz | 1 MHz |
| Room temp. | 0.009 | 0.016 | 0.019 | 0.014 |
| 100° C. | 0.009 | 0.009 | 0.010 | 0.017 |
| 150° C. | 0.015 | 0.013 | 0.012 | 0.014 |

As Table 1 shows, the dissipation factor is always less than 2% in the frequency and temperature range studied. Remarkably, the dissipation factor even improves slightly with increasing temperature. This shows that polyamideimide as a dielectric has excellent dielectric properties.

Figure 2B:
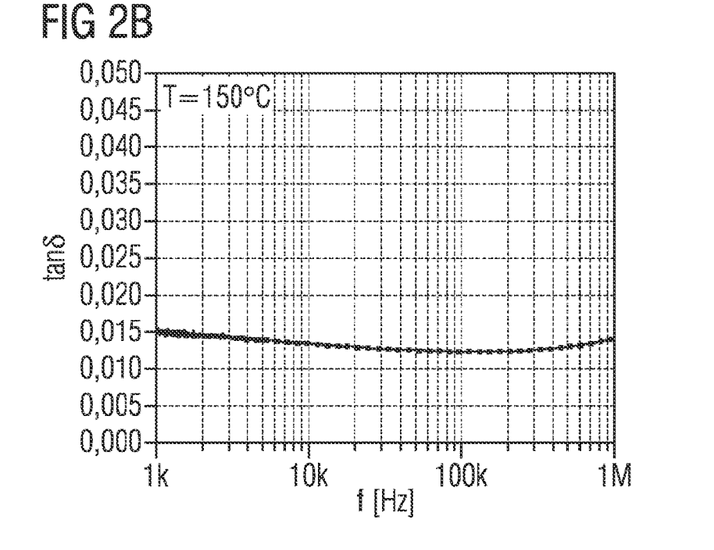
FIG. 2b shows the course of the loss factor of a capacitor.

This is also confirmed in the graph shown in FIG. 2B, which shows the dissipation factor of the dielectric layer described in reference to Table 1 at a constant temperature of 150° C. as a function of frequency. Thus, it can be observed that the dissipation factor can be considered constant in a first approximation in the investigated frequency range between 1 kHz and 1 MHz.

This constant behavior allows a wide use of polyamideimide capacitors in general and a high flexibility of the single polyamideimide capacitor in particular.

Table 2 shows the dependence of the permittivity ($\epsilon_r$) of a polyamideimide plate capacitor corresponding to the structure shown in FIG. 1 on temperature and electrical frequency. The dielectric layer used here was prepared with a 19 wt % solution based on the polyamideimide-resin blend originally used. The layer thickness was 5 µm and the area of the capacitor was 50 mm$^2$. The measurement was performed using a Keysight E4990A with Novocontrol's PHECOS cooling/heating system.

TABLE 2

| | $\epsilon_r$ | | | |
| --- | --- | --- | --- | --- |
| | Frequencies | | | |
| Temperature | 1 kHz | 10 kHz | 100 kHz | 1 MHz |
| Room temp. | 4.0 | 4.0 | 3.8 | 3.6 |
| 100° C. | 4.6 | 4.4 | 4.3 | 4.1 |
| 150° C. | 5.0 | 4.7 | 4.5 | 4.3 |

Table 2 shows that there is only a moderate variation in permittivity with respect to temperature and frequency. Although a decrease in permittivity with increasing frequency and an increase in permittivity with increasing temperature can generally be observed, the polyamideimide, with an average permittivity of 4, has almost twice the permittivity of the standard material BOPP.

This high permittivity is attributed to the partially aromatic character, as well as the polar groups, such as furan groups, of the polyamideimide. In addition, it is possible in principle to adjust the polyamideimide in such a way that the dielectric losses or other properties are optimized in a specific frequency range. This can be done both by the composition of a prepolymer polyamideimide solution from different polyamideimides, and by the specific selection of functional groups on the main chains.

For the plate capacitor described in Table 2, the breakdown voltage at room temperature is between 300 and 550 V/µm, depending on the frequency (measured with Sefelec S50). The insulation resistance at room temperature is always above 3 TΩ (measured with Novocontrolsystem Alpha A).

This shows that the polyamideimide used has excellent permittivity combined with high breakdown voltage and ohmic insulation resistance.

Figure 3:
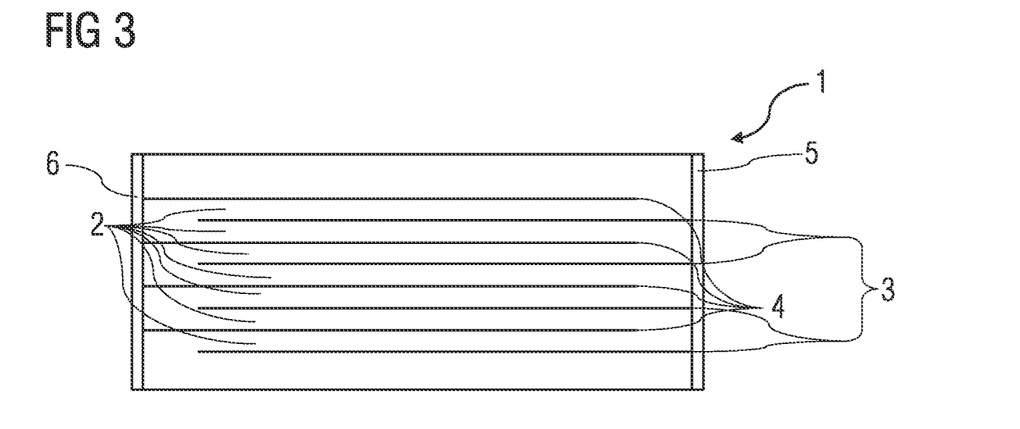
FIG. 3 shows a first multilayer capacitor as a second example of a capacitor in schematic cross-section.

FIG. 3 shows a second embodiment of a capacitor 1 in schematic cross-section. The capacitor 1 has a plurality of first electrodes 3 which are alternately stacked with second electrodes 4. Both electrodes are planar electrodes.

Between the first electrodes 3 and the second electrodes 4, i.e. between two adjacent electrodes in each case, a dielectric layer 2 is always arranged, which in each case corresponds to the dielectric layer 2 from the first embodiment example in FIG. 1.

The first electrodes 3 and the second electrodes 4 have the character of internal electrodes.

Thus, the second embodiment example of a capacitor 1 is a multilayer capacitor.

First external contacts 5 and second external contacts 6 are arranged on opposite side surfaces of the multilayer capacitor.

The first electrodes 3 are electrically conductively connected to the first external contact 5. The second electrodes 4 are electrically conductively connected to the second external contact 6.

The capacitor assembled in this way can be a surface mounted device (SMD), which is very suitable for soldering due to its temperature-stable dielectric layer 2. In order to be able to use the capacitor 1 even more advantageously as an SMD capacitor, the outer contacts 5 and 6 can have a clamp-like structure. That is, the outer contacts 5 and 6 can extend a certain distance onto the two side surfaces in the stacking direction.

For example, the capacitor may be cuboidal in shape and may comprise a total of woo repeating units or more, which include a first electrode, a dielectric layer, a second electrode, and another dielectric layer. It may have a length of 3 to 4 mm, a width of 2 to 3 mm, and a height of 1 to 2 mm. The single dielectric layer 2 here may have a thickness of 500 nm to 5 µm, preferably between 500 nm and 2 µm. The inner electrodes have a thickness of 10 to 50 nm and preferably 20 nm.

However, the dimensions of the finished capacitor may also differ from those given here. Length, width, height and layer thicknesses can be adapted to different technical requirements or with regard to different technical tasks.

A manufacturing method may be similar to the manufacturing method of the first embodiment. For example, a first electrode layer 3 can be deposited on a substrate by PVD. A dielectric layer 2 can then be deposited from solution, and then a second electrode layer 4 can be deposited, again by PVD, onto which a dielectric layer 2 is again deposited from solution. This can be repeated to achieve a desired number of layers or a specific capacitance of the capacitor.

In principle, the inner electrodes can be patterned in the process. This can be done either already during deposition or after the physical vapor deposition process.

After stacking, the substrate can be removed.

Optionally, a protective layer (not shown) similar to that of the first embodiment can then be applied to the side surfaces, which remain free of external contacts, by means of a vapor deposition process and solvent-based processes or coating processes.

The external contacts 5 and 6 are applied to the finished stacked capacitor 1. These can be made, for example, of brass, copper, tin, aluminum, silver or the like and can be applied either by means of physical vapor deposition processes or other, for example, solvent-based processes.

Figure 4:
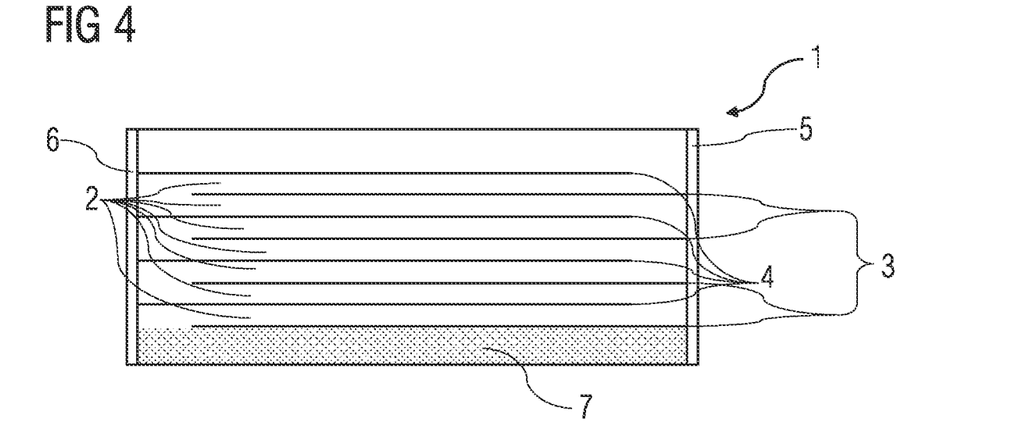
FIG. 4 shows a second multilayer capacitor as a third example of a capacitor in schematic cross-section.

FIG. 4 shows in schematic cross-section a third embodiment of a capacitor 1, which is also a multilayer capacitor.

The capacitor 1 in FIG. 4 corresponds in large parts to the capacitor as shown in FIG. 3 and described previously. However, in the example shown in FIG. 4, the original substrate, which in this case is the substrate 7 is shown as still being present on the component.

The substrate 7, in the case of FIG. 4, is insulating and may be, for example, a glass substrate, a semiconductor wafer, or may be a flexible substrate such as polyimide films or a release tape.

The manufacturing process for the third embodiment in FIG. 4 is the same as that for the second embodiment in FIG. 3, except for the removal of the substrate.

Figure 5:
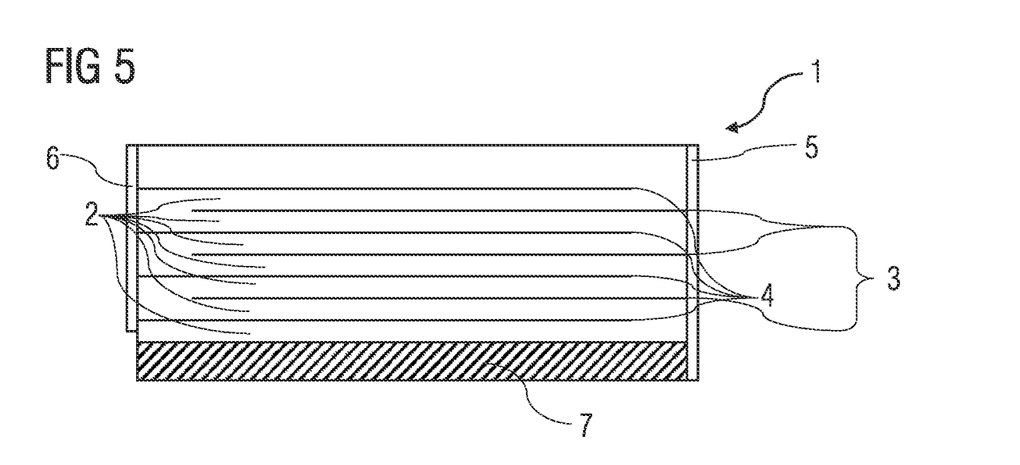
FIG. 5 shows a third multilayer capacitor as a fourth example of a capacitor in schematic cross-section.

In FIG. 5, a fourth embodiment of a capacitor 1 (here a multilayer capacitor) is shown in schematic cross-section. The fourth embodiment shown in FIG. 5 is similar in large parts to that shown in FIG. 4.

However, here the substrate 7 is a metallic, conductive substrate, for example made of aluminum, copper or similar materials. It is present, for example, as a film. Due to its conductive character, it is not necessary to apply a conductive layer as first electrode 3 on the substrate. The substrate 7 itself can serve as a substitute for one of the first electrodes 3. The dielectric layer 2 is then applied directly to it.

Since the substrate preferably extends across the entire width and length of the capacitor, care must be taken to ensure that the second external contact 5 does not make electrical contact with the substrate.

The process is also similar to the embodiment example described in FIG. 4.

Figure 6:
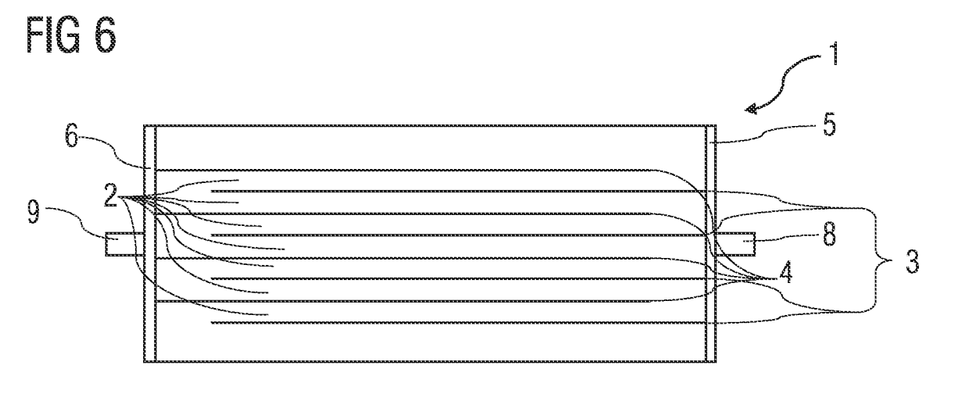
FIG. 6 shows a multilayer capacitor suitable for through-hole mounting as a fifth example of a capacitor in schematic cross-section.

The fifth embodiment, which is shown in schematic cross-section in FIG. 6, is similar in almost all aspects to the second embodiment of a capacitor 1. It is therefore also a multilayer capacitor. However, this multilayer capacitor has wires 8 and 9 on its outer contacts 5 and 6, which in one application allow it to be installed in a through-hole mounting. Thus, it is a through-hole capacitor. The wires 8 and 9 create an electrical and usually a mechanical contact with connection points in an application. The wires 8 and 9 can be attached to the capacitor 1 by any method, such as bonding.

Figure 7:
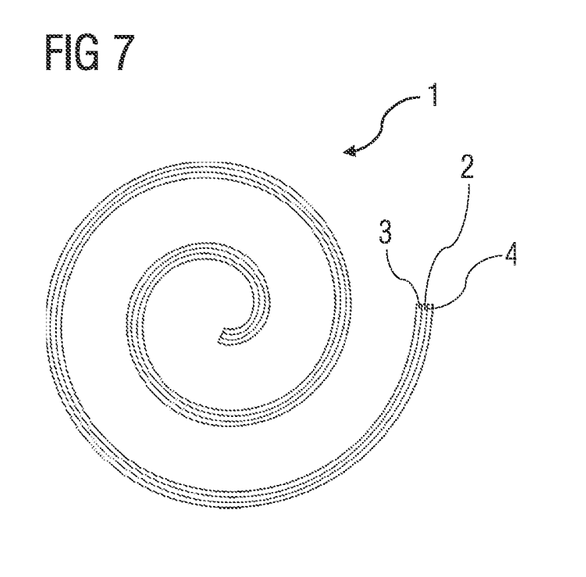
FIG. 7 shows a wound capacitor as a sixth example of a capacitor in schematic cross-section.

FIG. 7 shows in schematic cross-section a sixth embodiment of a capacitor 1. Here, the capacitor is a wound capacitor. In its structure, the wound capacitor is similar to the first embodiment example, that is, a dielectric layer 2 is sandwiched by a first electrode 3 and a second electrode 4. The corresponding sandwich-like structure is rolled up into a wound capacitor.

However, the manufacturing method used differs from the manufacturing method according to FIG. 1. Preferably, the dielectric layer 2 is first produced on a substrate using the deposition method described for FIG. 1. This can then be released from the substrate. It can then be post-processed by any method. Subsequently, the film thus obtained can be metallized on one side or, in the present case, on both sides by PVD. The metallized film thus obtained can be wound into a wound capacitor. Preferred film thicknesses for wound capacitor films with polyamideimide are in the range between 1 µm and 10 µm, preferably between 2 µm and 5 µm.

As an additional or alternative process for the production of various structural shapes, the formation of a polyamideimide film for a dielectric can first be carried out in a roll-to-roll process from solution by doctoring a prepolymer polyamideimide solution onto a substrate which has previously been provided with a release agent. This is followed by drying and simultaneous annealing at above 200° C., preferably at above 220° C., preferably at 250° C. This is followed by delamination or detachment of the dried and crosslinked polyamideimide film from the substrate and winding of the same. Optionally, an intermediate film can be wound along as protection. Subsequently, the electrodes are applied. This is preferably also carried out in a roll-to-roll process. The electrode layer or layers can be applied on one or both sides, depending on the technical requirements. The electrodes can be structured or remain unstructured. The thickness of the electrodes towards the edge can be adjusted or adapted. This is followed by segmentation of the roll with optional subsequent pressing to form a flat winding. Subsequently, external contacts are applied by flame spraying, PVD (e.g. sputtering, thermal evaporation) or by galvanic processes. The latter can be used to produce an SMD component. In the case of the flat winding, this is also followed by the application of the side contact and, in addition to this, also an application of wires and subsequent potting with a temperature-stable, water-repellent potting material. In the case of the SMD capacitor, a protective or barrier layer can be applied as described earlier.

However, further processing of the film produced as above can also be carried out using the sheet-to-sheet process. In this process, pieces of film are cut to a defined size, such as DIN A5 or DIN A4. These film pieces are then coated with the electrodes. This corresponds to the production of a mother stack. The electrodes are coated on both sides and structured using the PVD process. The individual film pieces are then stacked and pressed, after which the individual capacitors are cut from the mother stack, provided with a side contact, e.g. by means of flame spraying, electroplating or otherwise, and then stabilized by means of potting or a protective or barrier layer.

The invention claimed is:

1. A capacitor comprising:
   a dielectric layer including a polyamideimide, wherein the dielectric layer consists of a single homogenous layer; and
   a first electrode disposed directly adjacent to the dielectric layer.

2. The capacitor according to claim 1, further comprising a second electrode also arranged directly adjacent to the dielectric layer.

3. The capacitor according to claim 1, wherein the dielectric layer consists of 50% by weight or more of the polyamideimide.

4. The capacitor according to claim 1, wherein the dielectric layer is free of solid inorganic materials.

5. The capacitor according to claim 1, wherein the polyamideimide contains polyamideimide main chains comprising amide and imide groups of the polyamideimide.

6. The capacitor according to claim 5, wherein the polyamideimide main chains are partially aromatic.

7. The capacitor according to claim 5, wherein chemical crosslinks are formed in the dielectric layer between the polyamideimide main chains or within a polymer main chain.

8. The capacitor according to claim 7, wherein the crosslinks linearly link polyamideimide main chains.

9. The capacitor according to claim 8, wherein a linear linkage is formed via an imide bridge or a urethane bridge.

10. The capacitor according to claim 8, wherein, in addition to a linear linkage, three-dimensional crosslinks are formed via urea bridges.

11. The capacitor according to claim 7, wherein the chemical crosslinks are selected from urethane bridges, imide bridges or urea bridges.

12. The capacitor according to claim 11,
    wherein the polyamideimide has a structure according to chemical formula 1,
    wherein $R^1$ is a lactam, an anhydride, a urethane bridge or an imide bridge,
    wherein $R^2$ is a phenylene group,
    wherein $R^3$ is a furan, an amine, an anhydride, a urethane bridge, or an imide bridge, and
    wherein the chemical formula 1 is:

[chemical formula 1]

13. The capacitor according to claim 1, wherein the polyamideimide has phenylene groups, anhydrides and/or furan groups as functional groups.

14. The capacitor according to claim 1, wherein a plurality of first electrode layers are stacked alternately with second electrode layers, and the dielectric layer is disposed between each two adjacent electrode layers.

15. The capacitor according to claim 14, wherein all first electrode layers are electrically conductively connected to a first external contact, and all second electrode layers are electrically conductively connected to a second external contact.

16. The capacitor according to claim 14, wherein a substrate is arranged on a side surface of the capacitor which is parallel to a plane of the electrode layers.

17. The capacitor according to claim 14, wherein the capacitor is a surface mounted device (SMD).

18. The capacitor according to claim 14, further comprising wires, the wires configured for through-hole mounting.

19. The capacitor according to claim 14, wherein the capacitor is a wound capacitor.

20. A method for manufacturing a capacitor, the method comprising:
forming a single homogenous dielectric layer by:
depositing a prepolymer polyamideimide solution on a deposition surface;
drying the prepolymer polyamideimide solution on the deposition surface; and
annealing the dried prepolymer polyamideimide solution,
wherein the dielectric layer of the capacitor consists of the single homogenous dielectric layer.

21. The method according to claim 20, further comprising:
releasing the dielectric layer from the deposition surface thereby providing a dielectric film;
metallizing the dielectric film; and
winding the metallized dielectric film,
wherein the deposition surface is a surface of a substrate.

22. The method according to claim 20,
wherein the deposition surface is a surface of an electrically conductive substrate or a first electrode layer, and
wherein the method further comprises:
after, depositing the dielectric layer on the deposition surface, forming a second electrode layer on the dielectric layer, and
forming a further dielectric layer on the second electrode layer by:
applying the prepolymer polyamideimide solution on the second electrode layer,
drying the prepolymer polyamideimide solution on the second electrode layer, and
annealing the dried prepolymer polyamideimide solution.

23. The method according to claim 20, wherein the prepolymer polyamideimide solution contains polyamideimide main chains on which isocyanate groups, lactam groups, and/or anhydride groups are arranged.

24. The method according to claim 20, wherein isocyanate groups, lactam groups, and/or anhydride groups are terminally arranged on polyamideimide main chains.

25. The method according to claim 20, wherein the prepolymer polyamideimide solution is applied by doctor blade coating, slot die coating, stencil printing, spin coating or spray coating.

26. A capacitor comprising:
a dielectric layer including a polyamideimide, the dielectric layer being uniform; and
a first electrode disposed directly adjacent to the dielectric layer,
wherein the polyamideimide contains polyamideimide main chains,
wherein chemical crosslinks are formed in the dielectric layer between the polyamideimide main chains or within a polymer main chain,
wherein the crosslinks linearly link polyamideimide main chains, and
wherein, in addition to a linear linkage, three-dimensional crosslinks are formed via urea bridges.

27. A capacitor comprising:
a dielectric layer including a polyamideimide, the dielectric layer being uniform; and
a first electrode disposed directly adjacent to the dielectric layer,
wherein the polyamideimide has a structure according to chemical formula 1,
wherein $R^1$ is a lactam, an anhydride, a urethane bridge or an imide bridge,
wherein $R^2$ is a phenylene group,
wherein $R^3$ is a furan, an amine, an anhydride, a urethane bridge, or an imide bridge, and
wherein the chemical formula 1 is:

* * * * *

UNITED STATES PATENT AND TRADEMARK OFFICE
CERTIFICATE OF CORRECTION

| | |
|---|---|
| PATENT NO. | : 11,996,239 B2 |
| APPLICATION NO. | : 17/642545 |
| DATED | : May 28, 2024 |
| INVENTOR(S) | : Six et al. |

It is certified that error appears in the above-identified patent and that said Letters Patent is hereby corrected as shown below:

On the Title Page

Item (72), in Column 1, in "Inventors", Line 1, before "Stefan" insert -- Dr. --.

In the Claims

In Column 14, in Claim 12, Line 37, delete "[chemical formula 1]".

Signed and Sealed this
Third Day of December, 2024

Katherine Kelly Vidal
*Director of the United States Patent and Trademark Office*